Nov. 25, 1958  G. A. TINNERMAN  2,861,617
WIRE-LIKE FASTENING DEVICES FOR SECURING A NUT IN A RECESS
Filed Feb. 3, 1955

Inventor
GEORGE A. TINNERMAN.
By~ Fetherstonhaugh+Co
Attys

United States Patent Office 2,861,617
Patented Nov. 25, 1958

2,861,617

WIRE-LIKE FASTENING DEVICES FOR SECURING A NUT IN A RECESS

George A. Tinnerman, Lakewood, Ohio

Application February 3, 1955, Serial No. 486,010

3 Claims. (Cl. 151—41.73)

This invention relates to improvements in fastening devices and in particular to an arrangement for holding a nut firmly in position for the reception of a threaded bolt. In assembly work there are many instances wherein a nut has to be so located that it is very difficult, if not impossible, for the operator to manually hold the nut in place for the insertion of the bolt and afterwards to hold the nut against rotation when the bolt is being tightened.

A number of nut fastening devices have been invented for the foregoing purpose, but in general are more particularly designed to be anchored to sheet metal parts, as for example, those shown in my United States Patents Nos. 2,159,573 and 2,266,832, issued May 23, 1939, and December 23, 1941, respectively.

The object of my present invention is to provide a fastening device by means of which a nut may be readily anchored to a wooden part or the like, the anchoring means comprising several prongs suitably mounted upon the nut and which are arranged to be capable of being driven by a hammer blow into the surface of the part to which the nut is to be attached.

A further object of the invention is to so arrange the prongs that they extend downwardly from the plane of the outer face of the nut and are inturned to a slight degree towards the side faces of the nut, whereby the prongs when driven into the nut supporting part have a tendency to toe inwardly and tightly anchor themselves in place.

The prongs preferably constitute the down turned ends of metal strips or wires which straddle the top of the nut, and which may be attached thereto in any one of several different ways. Another object of the invention being to form the outer portion of the nut with two substantially parallel slots or grooves within which the prong strips are swingably carried; the tips of the prongs each preferably having a single inclined chisel face, whereby the faces tend to gradually swing prongs from a substantially vertical position to a position at a slight outward inclination to the bore of the nut when they are driven into the nut supporting part, thus achieving additional anchorage against any dislodging forces.

With the foregoing and other objects in view, the invention is illustrated in the accompanying drawing in which.

Figure 1:
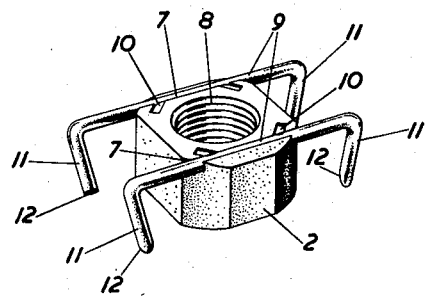
Fig. 1 is a perspective view of the nut.

The nut 2, apart from the prongs and their mountings is of standard form, and as is generally the case in a wooden or the like construction wherein a nut is attached to a part 3, the face 4 of the part to which the nut is to be fastened is formed with a nut receiving countersink 5 around a bolt hole 6.

Upon reference to Fig. 1, it will be seen that the top of the nut is formed with a pair of parallel slots 7 positioned on either side of the threaded hole 8, and within which a pair of separate wire-like prong ended strips 9 are a relatively snug fit. To retain the strips against displacement, the face of the nut is peened in several spots along the sides of the slots as indicated at 10.

Figure 2:
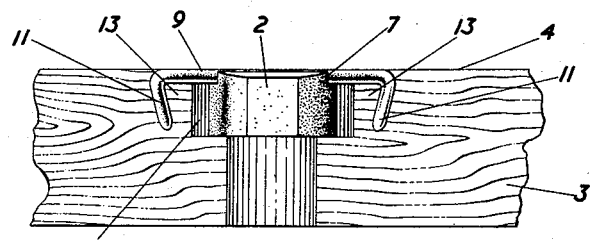
Fig. 2 is a cross-sectional view through a part to which the nut, embedded in a countersink, is attached, and showing one of the prong strips with its prongs on each end thereof driven into the part.

The nut anchoring prongs 11 depend downwardly from the ends of the strips 9, being preferably inturned to a slight degree towards the side faces of the nut, as shown in Fig. 2. The strips 9 are of greater length than the outer diameter of the nut whereby the prongs are spaced away from the nut.

Figure 3:
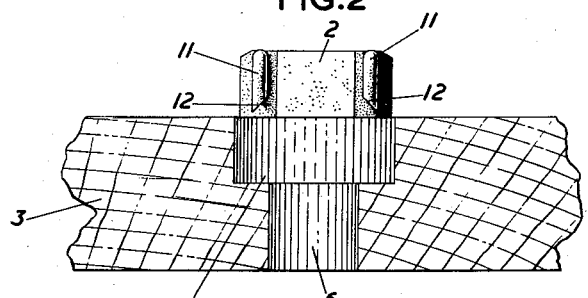
Fig. 3 is a cross-sectional view through a part to which the nut is to be attached, and showing the nut above the countersink in the part in which the nut is to be contained, two oppositely positioned prongs being shown.
Figure 4:
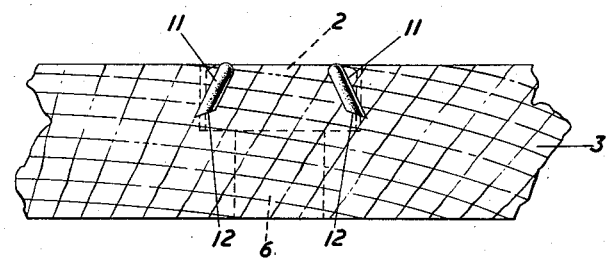
Fig. 4 is a similar view to Fig. 3 and showing the nut in the attached position.

Each of the prong tips is preferably formed with an inclined chisel face 12, the faces being so sloped and positioned in substantially parallel relation to the strips that inward passage of the prongs into the nut receiving part forces the prongs to swing sideways to a slight degree from the initial position shown in Fig. 3 to the driven home or gripping position shown in Fig. 4.

The application of the nut is self evident from the drawing, the nut being first positioned to register with the countersink 5 and tapped into the countersink with one or two hammer blows, under which the prongs enter and anchor themselves in the part as illustrated in Figs. 2 and 4.

It will be seen upon reference to Fig. 2 that on account of the prongs being slightly inturned towards the faces of the nut, the prongs in their inward passage will tend to inturn somewhat further in being driven home and thus compress the portions 13 abutting the body of the bolt in the hole 6 and which will react against the prongs to squeeze them firmly. As previously explained, the chisel faces 12 of the prongs will force them to swing sideways in an outward direction when being driven, it being understood that the prong strips 9 can rotate within the slots 10 as the prongs swing. The resultant compounded paths of travel of the driven prongs are such that the prongs bind within the material of the part at a very definite inclination to the orifice axis of the nut and therefore provide a very great resistance against dislodgement or turning of the nut when a bolt is inserted and tightened. It will be appreciated that the degree of angularity of the driven prongs will be self adjusting in proportion to the density and fibrous characteristics of the material into which they are driven, tests having shown that due to all the prongs being inclined inwardly towards an area surrounding the bolt hole when driven home that the nut anchorage has a tenacity very greatly beyond any normal nut dislodgement forces that could be applied.

It will also be apparent that in cases where the nut is to rest upon the surface of a part, and not to be contained within a countersink, that it is only necessary to have the prongs of greater length than the height of the nut whereby they will enter the part to anchor the nut upon its surface. The longer prongs also permit the nut to be anchored upon a flat metal surface having holes suitably positioned therein for the reception of the prongs.

While it is preferred that the fastening strips 9 be disposed in slots as described with the face of the nut peened or swaged to secure them as well as to permit rotational movement thereof, it will be obvious that the strips may be mounted and secured otherwise such as rigidly secured as by welding or the like and it will be apparent also that the prongs, even in a rigidly secured member, by reason of their chisel faces will tend to cause the prongs to bend and spread.

What I claim as my invention is:

1. A device for securing an orificed nut-like element having two major faces in a counter-sunk portion of a stud passage hole in an article for reception of a bolt or stud passed through the hole to be engaged with said nut-like element and comprising a pair of separately positioned independent substantially parallel pre-hardened wire-like strips each having a body portion which terminates in a sharpened prong at opposite ends thereof, the body portion of each being disposed in a plane substantially parallel to the major faces of said nut-like element and permanently secured thereto in a plane normal to a diameter of the orifice thereof, said prongs being spaced from the outer wall of the nut-like element and of a length less than the over-all thickness of said nut-like element, said prongs being bent at an angle to said faces and extending substantially in the direction of the axis of said orifice and adapted to penetrate said article and secure said nut-like element against axial displacement in stud receiving position within said counter-sunk portion of said stud passage hole prior to introduction of said stud thereto for engagement with said nut-like element, and thereafter also to secure said nut-like element against rotational displacement.

2. A device as claimed in claim 1 wherein the strips are rotatably anchored within open topped slots in the top face of the nut, the point of each prong being formed with a chisel face arranged to tend to swing the prong and its strip upon the prong being driven into the article.

3. A device as claimed in claim 1 wherein the strips are rotatably anchored within open topped slots in the top face of the nut and their prongs inturned to a slight degree towards the side faces of the nut, the point of each prong being formed with a chisel face arranged to tend to swing the prong and its strip upon the prong being driven into the article.

References Cited in the file of this patent

UNITED STATES PATENTS

| | | |
|---|---|---|
| 538,730 | Ellingson | May 7, 1895 |
| 821,471 | Dewett et al. | May 22, 1906 |
| 1,264,259 | Bennett | Apr. 30, 1918 |
| 2,345,053 | Judd | Mar. 28, 1944 |
| 2,772,560 | Neptune | Dec. 4, 1956 |